United States Patent [19]

Higbee

[11] 4,015,796
[45] Apr. 5, 1977

[54] VEHICLE SENSITIVE INERTIAL SENSOR FOR RETRACTORS AND THE LIKE

[75] Inventor: Wallace Carson Higbee, Romeo, Mich.

[73] Assignee: The Firestone Tire & Rubber Company, Akron, Ohio

[22] Filed: June 7, 1974

[21] Appl. No.: 477,296

[52] U.S. Cl. .................................. 242/107.4 A
[51] Int. Cl.² ..................................... B65H 75/48
[58] Field of Search ............... 242/107.4, 107.5 B, 242/107 R; 280/150.5 B; 200/61.45 R, 61.45 M, 61.5, 61.52, 153 A; 188/275; 246/173; 180/82 C

[56] References Cited

UNITED STATES PATENTS

| | | | |
|---|---|---|---|
| 1,918,034 | 7/1933 | Hadley | 188/275 X |
| 2,140,359 | 12/1938 | Hanna | 188/275 |
| 3,722,824 | 3/1973 | Hayashi | 242/107.4 |
| 3,758,044 | 9/1973 | Nilsson | 242/107.4 |
| 3,868,068 | 2/1975 | Heath | 242/107.4 A |
| 3,905,562 | 9/1975 | Kell | 242/107.4 A |

Primary Examiner—Leonard D. Christian
Attorney, Agent, or Firm—Miller, Morriss and Pappas

[57] ABSTRACT

A post supported bell pendulum omnidirectional inertial sensor for seat belt retractors and the like in which the bell shaped pendulum rests on a post and the post is positioned vertically in a vehicle such as an automobile. The bell pendulum has substantially more mass depending in its flared skirt portion and includes a flat top so that upon displacement of the bell shaped pendulum from the axis of the post, the flat top is cocked or tilted and elevates. This mechanically changes the effective elevation to trip or move a stop control lever and cause a locking of the retractor against withdrawal when inertial imbalance is sensed.

4 Claims, 4 Drawing Figures

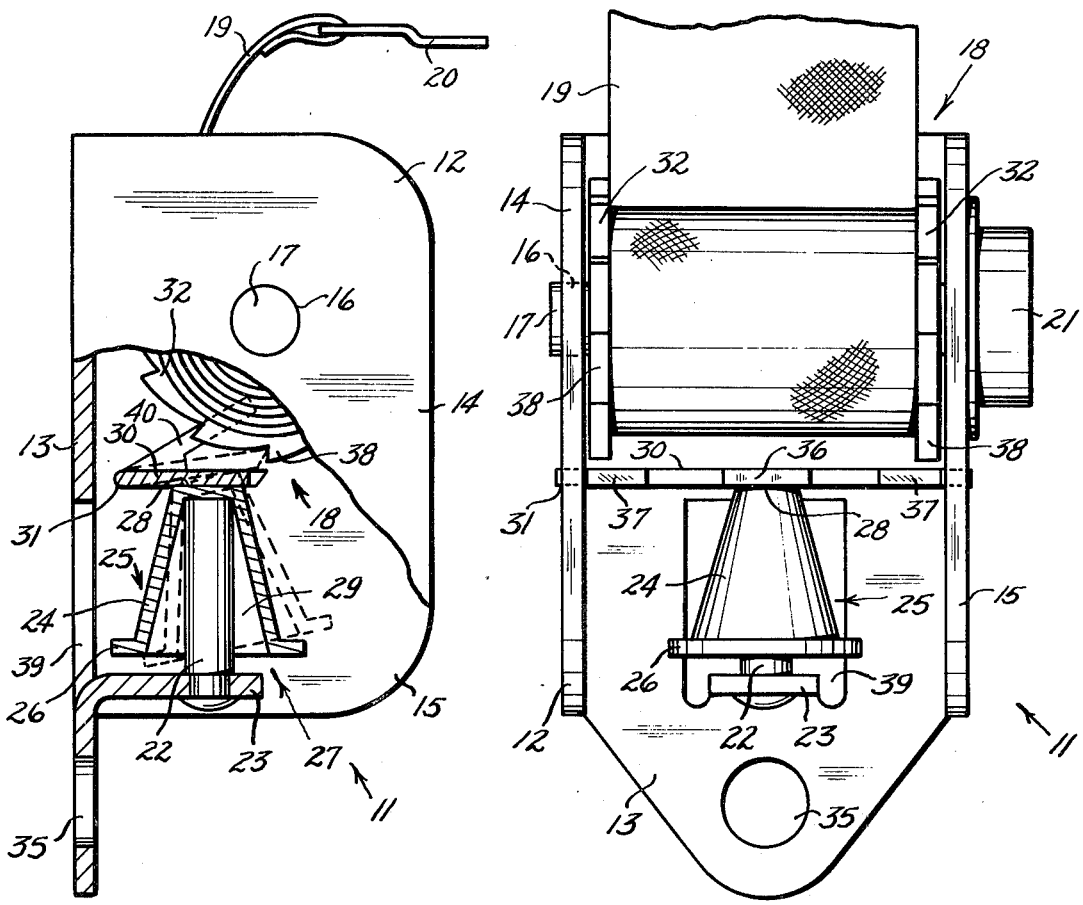
FIG. 1
FIG. 2
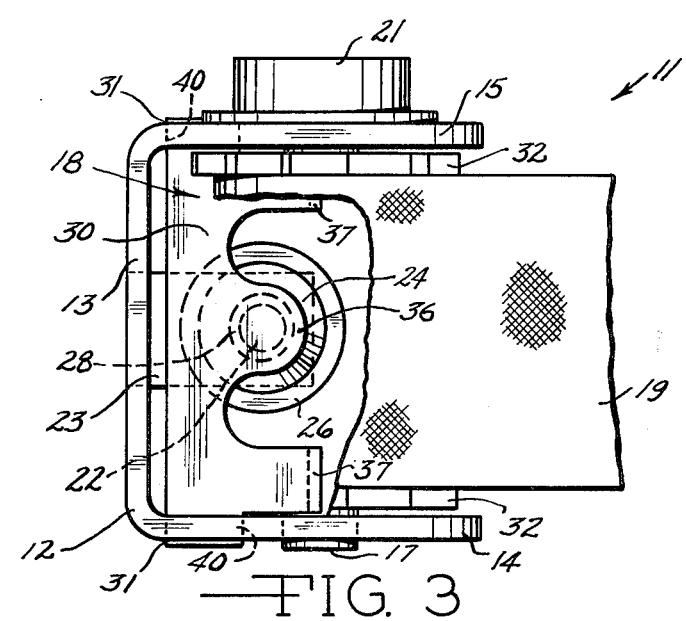
FIG. 3

VEHICLE SENSITIVE INERTIAL SENSOR FOR RETRACTORS AND THE LIKE

The present invention is a substantial improvement in inertial pendulum type sensors as applied to seat belt retractors and the like. The omnidirectional sensor herein described is a one-piece structure which is easily cast or formed to adequate tolerance and repetitive accuracy so as to materially reduce the cost of fitting and forming pendulum type structures and their hangers. In addition, a simple post forms the mounting bracket for the bell shaped pendulum and the skirt portion of the pendulum provides the depending symmetrically disposed weight or mass. The assembly is greatly simplified since no fastener is required as between post and bell pendulum and the lever, latch or pawl bar retains the bell pendulum against displacement.

Used alone, the bell pendulum construction provides an adequate low cost inertial sensor to lock safety belt retractors in emergency situations. When combined with other locking methods, the bell pendulum of the present invention provides an excellent redundant lock structure.

Prior art pendulum locking inertial systems for seat belt retractors are best represented in the U.S. Pat. No. 3,489,367 to Kovacs et al; 3,495,786 to Hemens; 3,508,720 to Kell; and 3,578,260 to Kell. None of this art is seen to show or suggest the stark simplicity of the presently disclosed bell pendulum structure as an inertial sensor for seat belt retractors.

Accordingly, the principal object is to provide a bell pendulum omnidirectional inertial sensor.

Another object is to provide a pendulum structure for inertial locking of safety belt retractors in which the sensor acts directly on the pawl structure when inertial imbalance occurs or when the axes of bell pendulum and post diverge.

Another object is to provide a post supported pendulum structure, the post being adjusted in the vehicle to normal vertical.

Still another object is to vastly simplify the locking arrangement in seat belt retractors so that an inertial locking retractor is economically feasible and other objects will be apparent as the description proceeds.

BACKGROUND OF THE INVENTION

Inertial locking retractors have a substantially long history and were first applied to seat belts and safety harness in the aircraft industry with considerable increase preceding and during World War II. Such structures were intended to provide maximum freedom of movement for pilots and users while providing substantially instantaneous protection under emergency conditions which cause an inertially sensed imbalance. Some of such devices were webbing sensitive and locked on accelerated withdrawal of the webbing. Others of such devices were vehicle sensitive so that locking occurs when an inertial imbalance occurs in the vehicle or aircraft. The latter devices for the most part involved pendulum structures which were position sensitive and responding to change of acceleration in the principal line of travel or were omnidirectionally sensitive in that inertial imbalance from any direction in the plane of the vehicle would move the sensor pendulum and cause the lock-up of associated retractor structure, thus stopping any further webbing withdrawal and thus restraining the user from projection from his seat or position.

In the present invention, the object is to provide a pendulum to accomplish omnidirectional inertial sensing and where the mechanical movement of the novel pendulum structure acts directly on a lever or latch bar to prevent withdrawal of webbing from a retractor drum by engaging the pawl element against a ratchet wheel which is a part of the retractor reel.

When the words, "Bell Pendulum" are used herein, they are intended to describe succinctly a hollow form in somewhat the shape of a truncated cone closed and flatted at the smaller end and open at the larger end and in which the mass is so distributed as to place the center of gravity well below the smaller end and concentrated adjacent the lower perimeter or skirt. The material of construction may be metal or resin. In some instances a composite construction could be desirable, the bell pendulum being in an injection molded plastic and having attached thereto a high specific gravity ring or annulus to concentrate the mass at or adjacent to the skirt perimeter.

IN THE DRAWINGS

FIG. 1 is a side elevation view of an inertial retractor, partially cut away and sectioned to show the construction and operation of the present invention.

FIG. 2 is a front elevation view of the structure seen in FIG. 1 and showing the bell pendulum element in normal depending position with the top portion engaged with the pawl bar.

FIG. 3 is a top plan view of the invention shown in FIGS. 1 and 2 but with the reel and webbing partially cut away to reveal the pawl bar overlaying the bell pendulum.

GENERAL DESCRIPTION

Figure 4:
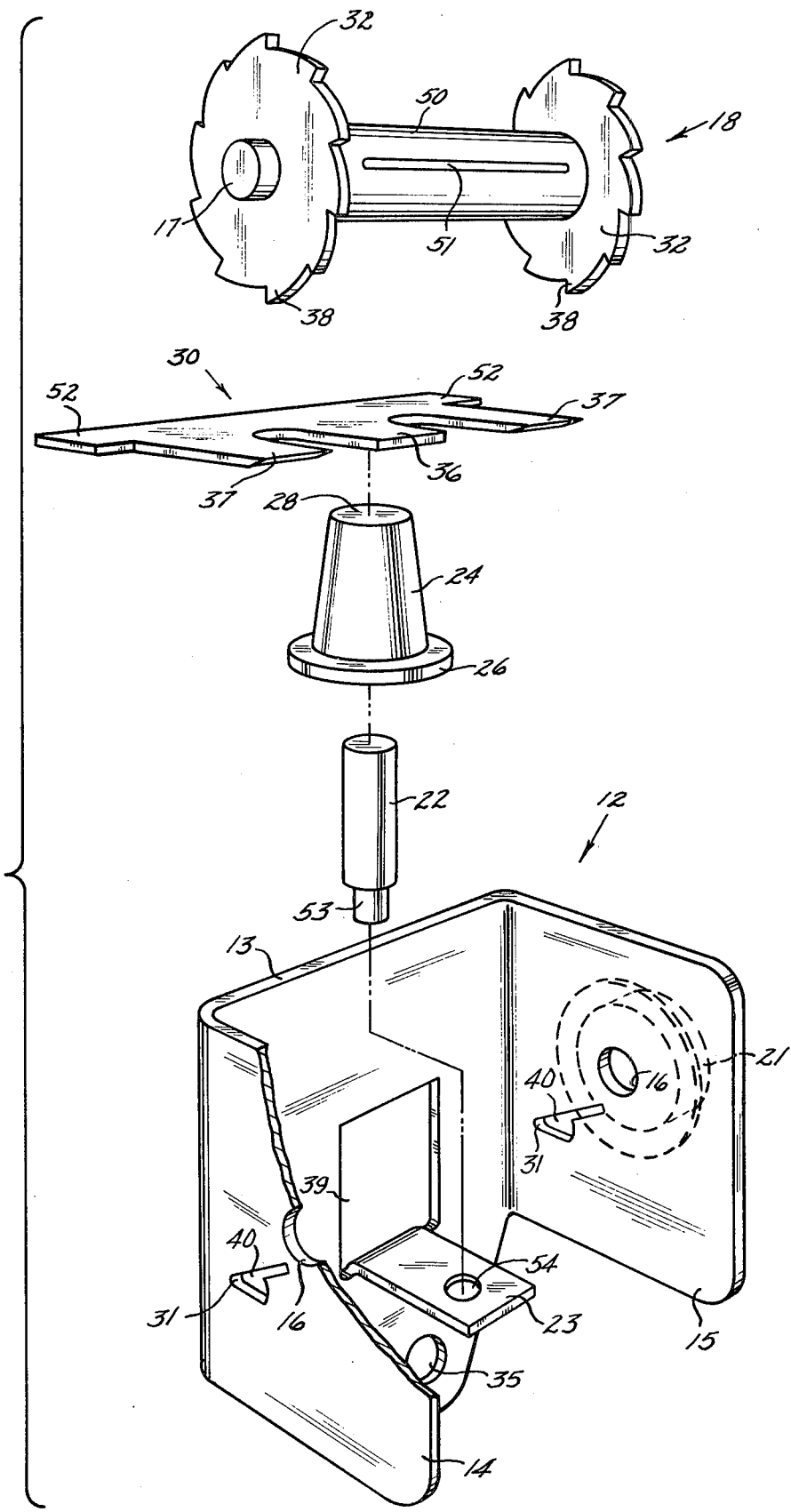
FIG. 4 is an exploded perspective view revealing the omnidirectional sensing properties of the structure seen in FIGS. 1–3 but with the webbing removed from the reel and the pendulum support shown in phantom line.

The invention comprises a bell shaped pendulum in the form of a truncated hollow cone closed at the smaller end and open at the larger end and free to tilt in any direction on a vertically oriented post. The external smaller end is flat topped so that as the axis of the pendulum or cone tilts away from the axis of the post, the flat top portion correspondingly tilts and can thereupon mechanically move a latch or actuating lever, for example, thereby sensing the displacement and relaying the displacement mechanically so that a pawl, for example, is moved into blocking engagement with a ratchet wheel or wheels which rotate with a reel of a retractor. Hence, as a mechanical imbalance of an inertial nature is sensed or the axes of pendulum and post separate, a retractor reel carrying cable or webbing is locked against withdrawal and until retraction occurs, the lock is maintained. It will be appreciated that in the retractors a spring motor urges webbing or cable into the wound-up condition on a reel or drum. The spring motor bias is relatively easily overcome when a driver or passenger withdraws webbing from the drum and secures it to a buckle or belt remote from the retractor. Ordinarily, the light spring bias is all that resists withdrawal until a crisis is sensed inertially and the displaceable pendulum relocates on the vertical post. On displacement of the pendulum on the post the tilting of the pendulum top exerts a displacement force on the lever which directly or indirectly tilts the latch or pawl into the path of the ratchet teeth and the ratchet wheels. The grip continues so long as a force is applied tending toward withdrawal of the webbing from the reel. When the webbing is freed from the force, the retraction spring motor urges pick-up of slack and the pawl is knocked out of the restraint path so that retraction can proceed. Withdrawal, of course, is prevented so long as the pawl is urged into contact by the pendulum. This provides a simple inexpensive and accurate inertial control for seat belt retractors in which a vehicle sensitive lock system is desired. In addition, the present invention finds excellent application in the redundant form of retractor lock construction.

SPECIFIC DESCRIPTION

By reference to the attached drawings and in first particular to the FIG. 1 thereof, a safety belt retractor 11 is shown comprising a generally channel shaped main frame 12 having a base of mounting web 13 and integral side leg flanges 14 and 15. The flanges 14 and 15 provide journal support at the openings 16 for the shaft 17. The shaft 17 supports the drum 18 upon which the webbing 19 is wound. The outermost terminal end of the webbing 19 is secured to a buckle or tongue element 20 for remote connection to hardware and webbing not a part of the present invention. As thus connected, the webbing 19 is intended to encircle a driver or passenger in a vehicle and to provide a restraint under certain conditions against displacement. The retractor 11 is secured to the vehicle body, chassis, or frame as convenient to accommodate particular harness arrangements. When unbuckled, the webbing 19 is rewound on the drum 18 by action of a spring motor located in the spring motor case 21 (FIGS. 2 and 3). The spring motor is a spirally wound spring well known in the art and secured at the outer end to the frame 12 via the case 21 and at the inner end secured to the end of the shaft 17. As webbing 19 is withdrawn from the drum 18, the spring motor stores energy and upon release of the stored energy as by release of the webbing 19, the spring motor rewinds the webbing 19 as shown.

The frame 12 is shown in the orientation as used in vehicles so that the vertical post 22 supported by the frame 12 is maintained in the normal vertical position in the vehicle. The most convenient support of the post 22 is by means of the inturned and lanced platform 23 integral with the frame 12 and lanced from the web 13. The post 22 is in the form of a cylinder riveted or staked to the platform 23. A pendulum 24 in the form of a bell shaped housing or mass 25 is placed over the post 22 as shown. The principal mass of the pendulum 24 is located at or adjacent the depending flared skirt portion 26 and the pendulum 24 is thus in the form of a truncated cone open at the flared base 27 and closed at the flat top 28. The hollow conical interior 29 allows the bell shaped pendulum 24 to rock on the post 22 in an omnidirectional sense as shown by the displacement of the pendulum 24 as shown in phantom line.

A latch lever 30 or actuating lever rests on the flat top 28 so that as the flat top 28 is displaced by movement of the pendulum 24 as shown in phantom line the latch lever 30 is mechanically lifted. The lever thereupon pivots on its fulcrum 31 and moves into interference position with the toothed ratchet wheels 32 which are in the form of flanges on drum 18. Hence, the latch lever 30 on displacement by the pendulum becomes a pawl and which upon engagement with the ratchet prevents further withdrawal of webbing 19. However, when tension is released on the webbing, the action of the spring motor in rewinding the webbing 19 on the drum overcomes the displacement of the pendulum 24.

While the platform 23 is shown integral with the frame 12, it may be separate to achieve selected adjustability to various mounting orientations. The opening 35 in the web 13 of the frame 12 provides a means to mount the retractor 11 to a vehicle, its frame, body, or chassis. The omnidirectional sensing quality of the pendulum 24 will be appreciated since any deviation between the axis of the pendulum 24 and the axis of the post 22 will result in tilting or elevation of the flat top 28. The force causing such displacement may be inertial as for example, in the instance of a sudden stop by the vehicle in which the retractor 11 is mounted. It may also occur from an impact against the vehicle. It may also occur where the vehicle is parked on a steep grade, for example. In each instance the force to potentially lock the drum 18 against withdrawal of webbing 19 is present and from any vector of force surrounding the post 22. The post 22 tends to remain stationary in respect to the vehicle. The pendulum 24 tends to move or continue movement and to apply the tilting of the flat top 28 to the lifting of the actuating lever 30 to lock the drum 18. Accordingly, the bell pendulum 24 is inertially responsive to changes in vehicular speed and to tilting terrain or attitude.

In the FIG. 2 the construction of FIG. 1 is better open to view and in the particular illustrated embodiment the latch lever 30 pivots at 31 and is seen to include the pad portion 36 which actually extends to overlay the flat top 28 of the pendulum 24 and the pawls 37 are best seen in registering position adjacent the ratchet wheels 32 which form the flanges of the drum 18. The ratchet teeth 38 are accessible to the pawls 37 when tilting of the pendulum 24 occurs. The lock is simple and effective and the leverage of the pendulum 24 need not be great but can be increased by increasing the mass of the skirt portion 26. While it is preferred to form the bell pendulum 24 by heavy metal as brass or iron, the pendulum 24 may be compositively constructed as desired by forming the cone of resin material and attaching a heavy specific gravity skirt 26 or annulus. The opening 39 indicates the form of lancing from the web 13 to form the platform 23.

In the FIG. 3 portions of the drum 18, webbing 19 and shaft 17 have been removed to show the latch lever 30 resting on the flat top 28 at the pad portion 36 and further illustrates the simplicity and omnidirectional sensing capabilities of the bell pendulum 24. The pivot supports 31 for the latch lever 30 are the result of pierced portions 40 through the frame sides 14 and 15 in support of the lever 30. This can also be appreciated by reference to the FIG. 1.

The exploded FIG. 4 best illustrates the simplicity of the inertially responsive seat belt retractor so far described and further illustrates the principal elements in their functional interrelationship. The drum 18 on the shaft 17 is shown without webbing 19 and indicating the hub portion 50 with web retaining slot 51 secured between and spacing the ratchet wheel flanges 32 with the peripheral ratchet teeth 38. The latch lever 30 with pawl elements 37 and tab portion 36 is positioned adjacent the drum 18 and on a pivot axis parallel to the shaft 17 of the drum 18. The pivot axis is established by the wing extensions 52 which impinge in the pierced portions 40 of the frame 12 at pivots 31. The pendulum 24 as previously described in detail rests on the post 22 and the flat top 28 of the bell pendulum 24 normally rests flatly against the pad 36 of the latch lever 30. Under such circumstances the axes of the bell pendulum 24 and of the post 22 are common. The post 22 is vertically secured to the platform 23 extended inwardly from the web 13 between the legs 14 and 15 of the frame 12 and leaving the opening 39. Journal openings 16 are provided in the legs 14 and 15 in support of the shaft 17 and drum 18. Bearing inserts may be used in the journal openings 16 but are not shown. The post 22 is fixed to the platform 23 by staking, riveting or other fastening after passing the shouldered extension stub 53 through the opening 54 in the platform 23. The spring motor housing 21 is secured to the leg 15 of the frame 12 and the rewind spring (not shown) is housed therein and grips the shaft 17 as it projects through the journal 16 and into the case 21. The simplest form of connecting the coiled flat spring to the shaft 17 is by insertion of the end of the flat spring in a slot bifurcating the end of the shaft 17 which projects into the housing 21.

Having thus described a specific embodiment of the invention, it will be appreciated that various forms of latch lever 30 may be utilized where inertial sensing occurs as the tilting of the conical pendulum 24 on the post 22 causes motion in the lever 30 which moves the pawl portions 37 into interference with relatively moving teeth of one or more ratchet wheels 32. The advantage of using two spaced apart ratchet wheels 32 and registering movable pawls 37 is that an equal lock stress is applied to the drum 18 so that on application of severe stress the shaft 17 and drum 18 in relation to frame 12 and journals 16 best carry the impact without distortion or damage. The frame construction may be modified to meet specific installation requirements, in particular vehicles, so long as the axis of the post 22 is vertical and the bell pendulum 24 rests on it and engages a latch lever 30.

The installation is relatively inexpensive, reliable in performance, and is amenable as a back-up or principal lock in a redundant or double lock retractor situation combining, for example, vehicle sensitive locking with webbing sensitive locking systems.

Having thus described the construction and utilization of the pendulum sensing combination in retractors, others skilled in the art will readily perceive modifications and improvements and such modifications and improvements are intended to be included herein limited only by the scope of the hereinafter appended claims.

I claim:

1. An omnidirectional inertial sensor of the mechanical type comprising:
   an upstanding flat topped post;
   a bell shaped flat topped mass having a flat inner surface resting on said post;
   an actuating lever extending over said flat topped portion of said bell shaped mass and displaceable by said flat topped portion of said bell shaped mass on omnidirectional displacement of said mass.

2. A pendulum for sensing omnidirectional inertial imbalance inertially actuated safety equipment such as seat belt retractors comprising:
   a frame structure;
   a flat topped post upstanding in said frame structure in a normal vertical direction;
   a bell shaped housing having an exterior flat top and having an internal flat surface parallel to said flat top of said bell shaped mass on said upstanding post; and
   an actuating lever having a portion extending over said flat topped exterior portion of said bell housing and displaceably movable by engagement with said flat topped exterior portion of said bell housing on inertial displacement of said bell housing in any direction relative to said post.

3. An inertial sensor of the omnidirectional type particularly useful in locking vehicle sensitive pawl locked seat belt retractors on inertial displacement and the like comprising:
   a support frame;
   a post extending upward from said frame and having a flat top and secured to said frame;
   a bell shaped pendulum having a conically hollow portion, a flat top, a flat interior parallel to said flat top and a relatively large annular integral depending skirt portion locating the center of mass of said bell shaped pendulum well below said flat top and in normal symmetry around said post; and
   a pawl actuating lever, one portion of which extends over said flat topped portion of said bell shaped pendulum and upon movement of said bell shaped pendulum, said pawl actuating lever is displaced by said flat topped portion of bell shaped pendulum.

4. An omnidirectional inertial sensor comprising for inertial retractors and the like comprising:
   a vertical post having a flat top;
   a bell shaped pendulum on said post in the form of a truncated cone open at the base and closed at the top, the top being flat in the form of a plane at right angles to the principal axis of the cone and having an internal flat surface engaging said post at said flat top of said post, said post displaceably engaging said top and normally the axis of said post being on the axis of said bell shaped pendulum; and
   a latch lever extended to engage said top of said pendulum and displaceable by said pendulum when said axes separate.

* * * * *